F. M. YERRINTON.
Pocket-Book for Fisherman.
No. 206,206. Patented July 23, 1878.
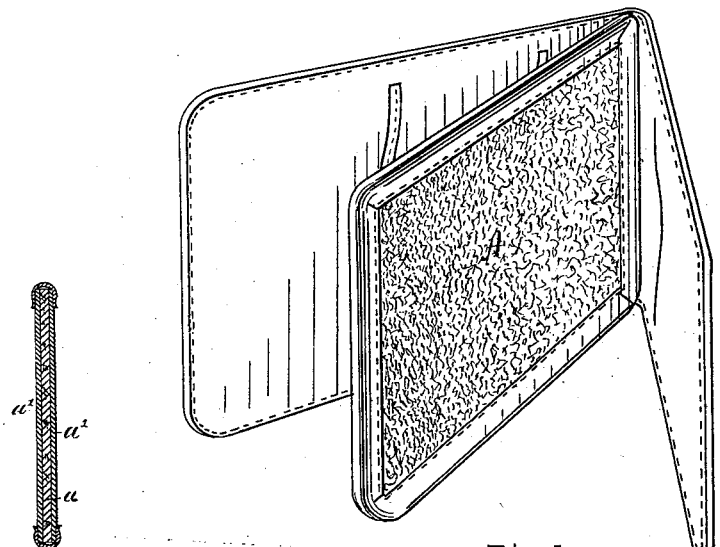
Fig. 1.
Fig. 5.
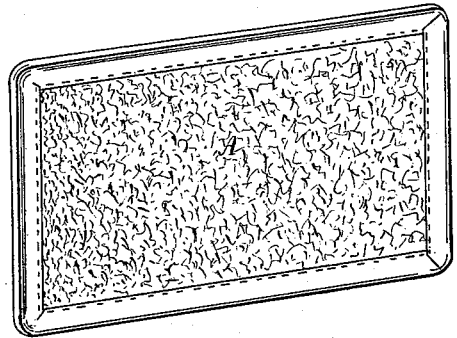
Fig. 2.
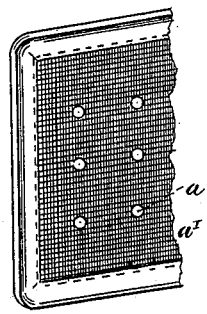
Fig. 3.
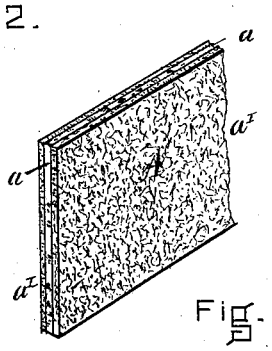
Fig. 4.
Witnesses
Geo. O. G. Coale
L. H. Slade
Inventor
Frank M. Yerrinton
by J. E. Maynadier
his atty.

UNITED STATES PATENT OFFICE.

FRANK M. YERRINTON, OF CAMBRIDGE, MASSACHUSETTS.

IMPROVEMENT IN POCKET-BOOKS FOR FISHERMEN.

Specification forming part of Letters Patent No. 206,206, dated July 23, 1878; application filed June 8, 1878.

*To all whom it may concern:*

Be it known that I, FRANK M. YERRINTON, of Cambridge, in the county of Middlesex and State of Massachusetts, have invented a new and useful Improvement in Pocket-Books for Carrying Fish-Hooks, of which the following is a full, clear, concise, and exact description, reference being had to the accompanying drawings, making a part hereof.

The object of my invention is to furnish a pocket-book for fishermen, in which fish-hooks may be securely held and carried without danger of rusting, and from which they may be easily taken.

In Figure 1 is shown, in perspective, a pocket-book embodying my invention, which consists in the use of a sheet of cork having secured to one or both of its sides a piece of felt, flannel, or other material capable of absorbing moisture. In Fig. 5 is shown a section of the leaf A, Fig. 2. The other figures show modifications.

A is the leaf, composed of a sheet of cork or some like substance suitable for receiving and retaining the points of fish-hooks and for protecting them from moisture and keeping them bright. a' a' are sheets of felt or like material, glued or otherwise properly attached to the sheet of cork A, the whole being bound, stitched, or otherwise finished off, if desired, and provided with a suitable cover.

In using this leaf the hook is stuck through the felt, which absorbs the moisture upon it, and into the cork sheet, which brightens it and prevents it from becoming rusty, and at the same time holds it firmly.

It is found that felt or some loosely-woven cloth, like coarse flannel, is the best material to use with the sheet of cork for my purpose, as it is very difficult to remove a hook the barb of which is caught in the threads of a closely-woven strongly-threaded cloth without cutting or tearing the cloth.

A closely-woven cloth may be conveniently used, however, instead of felt, provided openings of sufficient size are left in it to allow the barbed point of the hook to pass to the cork without catching in the cloth.

In Fig. 3 is shown a leaf having openings in the cloth a'.

The same result may be attained by cutting the cloth into strips and then fastening these strips to the cork at a proper distance apart to allow the hooks to be placed in the cork without catching in the cloth.

If the leaf A be not bound, hooks may be fastened to the cork at the edge of the leaf, as shown in Fig. 4, as well as through the felt.

The leaf A may be fastened to a proper cover, and the pocket-book so formed will be found very convenient by fishermen, especially for use with fly-hooks, so called, in the dressing of which so much water is held, the cork serving to keep the point of the hook bright and free from rust, and the felt or cloth to absorb the moisture from the point of the hook as it passes through it as well as from that part of the hook which rests against it.

What I claim as my invention is—

A pocket-book for fishermen having the leaf A composed of a sheet of cork covered with a sheet or sheets of absorbent material, in the manner and for the purpose set forth.

FRANK M. YERRINTON.

Witnesses:
J. E. MAYNADIER,
GEORGE O. G. COAN.